No. 818,878. PATENTED APR. 24, 1906.
W. E. EICHHOFF.
WIRE REEL.
APPLICATION FILED DEC. 19, 1903.
2 SHEETS—SHEET 1.
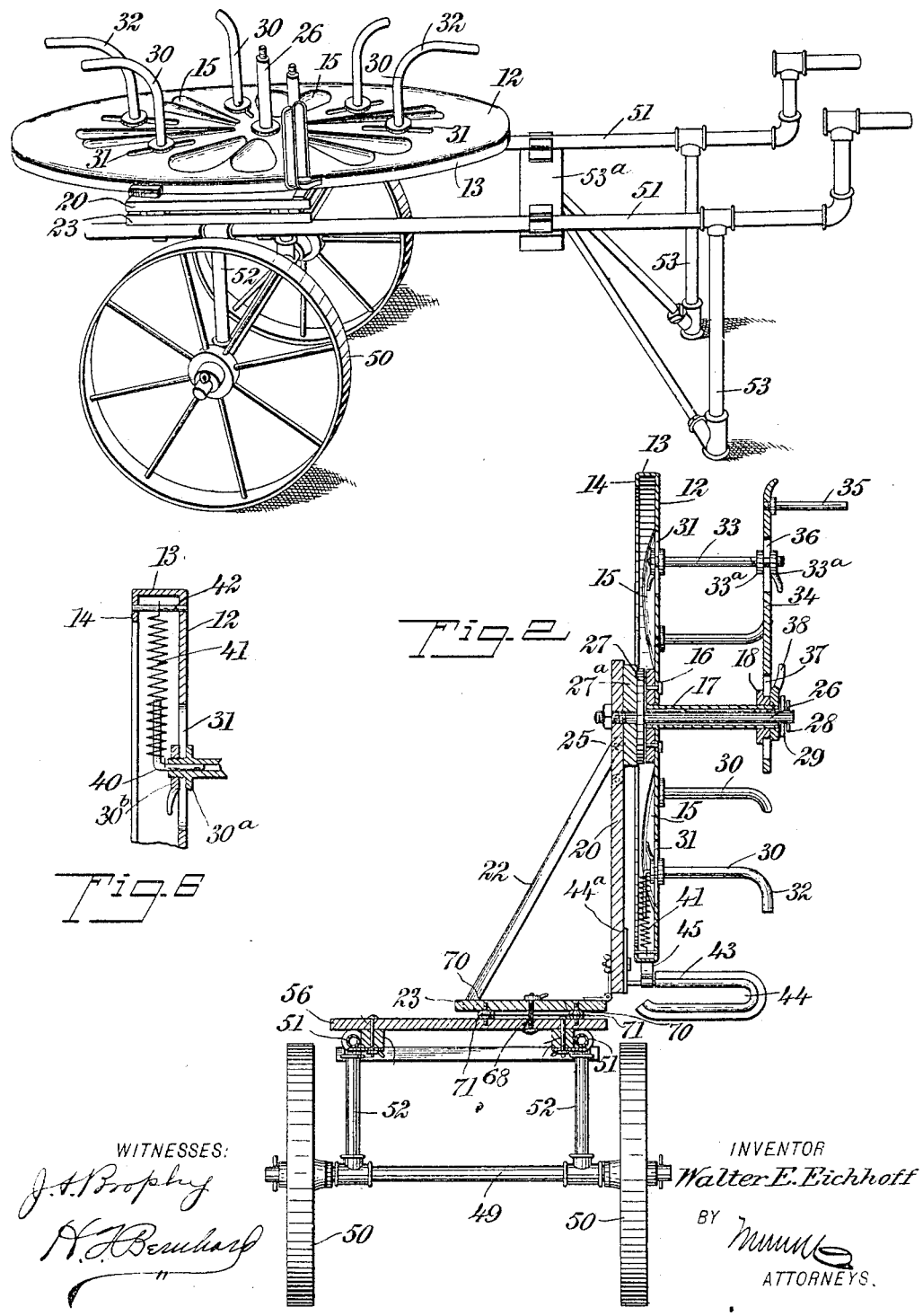
INVENTOR
Walter E. Eichhoff

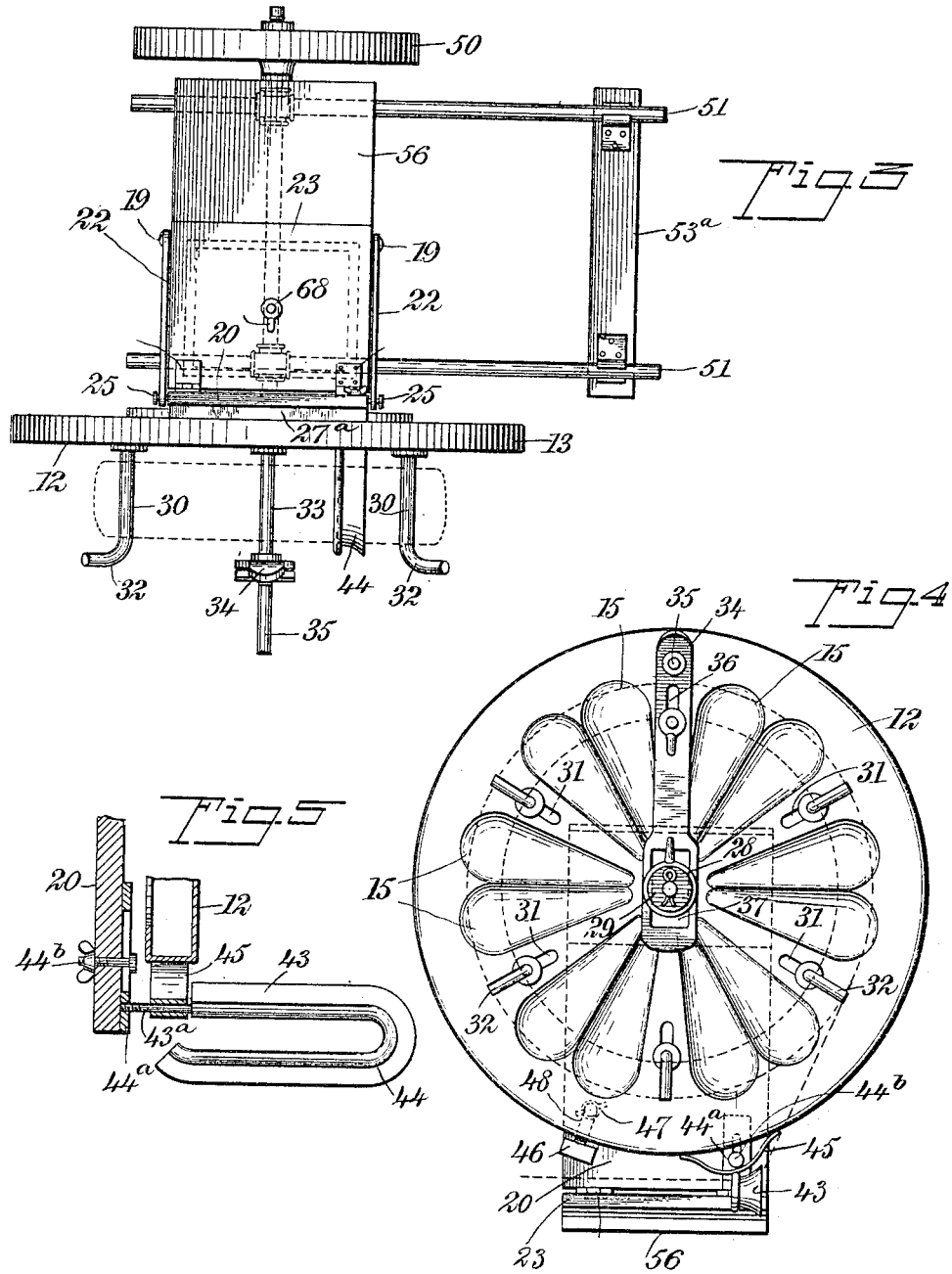

UNITED STATES PATENT OFFICE.

WALTER ELLSWORTH EICHHOFF, OF CAIRO, ILLINOIS.

WIRE-REEL.

No. 818,878.  Specification of Letters Patent.  Patented April 24, 1906.

Application filed December 19, 1903. Serial No. 185,834.

*To all whom it may concern:*

Be it known that I, WALTER ELLSWORTH EICHHOFF, a citizen of the United States, and a resident of Cairo, in the county of Alexander and State of Illinois, have invented a new and Improved Wire-Reel, of which the following is a full, clear, and exact description.

My invention relates to improvements in reels for winding and unwinding any kind of wire; and one object that I have in view is the provision of novel means for mounting the reel to the end that it may be adjusted to a variety of positions, whereby the reel is adapted to rotate in a vertical plane or in a horizontal plane or in an inclined plane, and provision is made for overcoming a tendency of the reel and its mount to tip or fall over when the structure is used on a hillside.

A further object of the invention is the provision of a simple and strong reel constructed especially to hold a mass of coiled wire under tension and prevent the wire from slipping off the reel.

A further object of the invention is to provide an improved form of wheeled truck on which the reel proper may be mounted in a detachable manner, said truck being equipped with a platform available as a means for supporting an extra coil of wire, tools, &c., when the reel is mounted on the truck, although the platform may be raised on the truck when the reel is dismounted, so as to serve as the bed of the truck.

Further objects and advantages of the invention will appear in the course of the subjoined description, and the actual scope thereof will be defined by the annexed claims.

Reference is to be had to the accompanying drawings, forming a part of this specification, in which similar characters of reference indicate corresponding parts in all the figures.

Figure 1 is a perspective view of a wire-reel mounted on a truck and constructed in accordance with this invention, the reel being shown in a position for rotation on a vertical axis. Fig. 2 is a vertical transverse sectional elevation through the reel and the truck, said reel being adjusted for rotation on a horizontal axis. Fig. 3 is a plan view of the reel and the truck, said reel being adjusted to the position shown by Fig. 2. Fig. 4 is a front elevation of the reel and certain devices which are associated therewith. Fig. 5 is a transverse sectional elevation through a part of the reel and a support therefor, showing an improved form of wire-guide by which the wire is directed to the arms on the reel; and Fig. 6 is a detail fragmentary sectional view through a part of the reel, showing one embodiment of means for normally drawing an arm of said reel in an outward direction.

The body of the reel 12 is stamped or struck up from a single piece of sheet metal in the form of a disk and is strengthened or reinforced by the provision of a bent rim and by the employment of a plurality of radial webs, thereby producing a light, strong, and cheap structure. As shown by the drawings, the body 12 has its edge portion bent to form a rim 13 and a flange 14, said rim lying at right angles to the plane of the body 12 and affording a surface with which is adapted to engage brake devices; but I do not desire to strictly confine myself to this special construction of the rim portion of the body, because I am aware that the edge of the body may be reinforced in an ordinary way by bending said edge around a reinforcement wire strip or length in a manner well understood by those skilled in the art.

Webs 15 are disposed radially to the axis of the reel-body, and they are dished or deflected inwardly from the plane of the exposed surface of said body 12. I prefer to arrange the webs in the manner shown by Fig. 4 of the drawings; but it will be understood that any kind of reinforcement may be applied to the sheet-metal body of the reel. This body is provided with a plurality of radial slots 31, which are disposed between certain groups of reinforcement-webs for a purpose which will presently appear, and on the rear side of the body a hub-plate 16 is fastened by suitable bolts, screws, or other fasteners, said hub-plate being provided with an axial threaded opening which is coincident with a similar opening in the sheet-metal reel-body. (See Fig. 2.) In said coincident openings of the reel-body and its hub-plate is screwed the male threaded end of an axial hub-sleeve 17, the latter projecting outwardly from the exposed surface of the body, as shown. Said outer end of the hub-sleeve 17 is braced to the body by the employment of a plate 34 and a bolt 33, the purpose of which parts is to reduce the strain on the center of the reel due to the imposition of the weight of coiled wire on the arms of the reel. The plate 34 is provided at one end portion with a wide slot 37, which is fitted over a flanged nut 18, that is screwed on the outer threaded end of the hub-sleeve 17, and this end portion of the plate 34 is clamped firmly against the nut 18 and in proper relation to the hub-sleeve 17 by a clamping-nut 38, the latter being screwed on the hub-sleeve outside of the nut 18. The other end of the plate 34 is provided with a longitudinal slot 36, that is loosely fitted over the bolt 33, the latter being fastened rigidly to the body 12 of the reel in any suitable way. This plate or bar 34 is clamped firmly on the fixed bolt 33 by coöperating nuts 33$^a$, which are screwed on the bolt for engagement with the respective sides of the slotted plate or bar 34. (See Fig. 2.) The plate or bar is extended a suitable distance beyond the bolt 33, and it is provided with a handle 35 for the convenient rotation of the reel by hand.

The entire reel is mounted for rotation on a spindle 26, which is fixedly supported in a suitable framework presently to be described.

The hub-sleeve 17 of the reel is fitted loosely on the spindle 26, so that it will turn freely thereon, and the reel is prevented from displacement laterally in one direction by the employment of a washer 29 and a key 28. This washer is fitted on the spindle to engage with the end portion of the hub-sleeve 17 and with the clamping-nut 38, and said washer is engaged by the key 28 to hold the parts in position and allow the reel to rotate on the spindle.

The reel is equipped with a plurality of spring-actuated arms 30, the same being movable radially and freely in the slots 31 of the reel-body. Each arm 30 of the reel is tubular in form and provided with a bent or hook-shaped outer end 32, whereas the inner portion of the reel-arm is provided with a collar 30$^a$ and with a threaded inner extremity. (See Fig. 6.) This threaded inner end of each reel-arm passes loosely through one of the radial slots 31, so as to bring the collar 30$^a$ of the arm in engagement with the exposed face of the reel-body, and on the threaded end of the reel-arm is a nut 30$^b$, the latter coöperating with the collar 30$^a$ in restraining the reel-arm from endwise displacement on the reel-body. The arms 30 are spaced around the reel-body and project outwardly therefrom, so as to afford the winding-surface for the wire on the reel, and each tubular arm is free to play in the radial slots, whereby the arms 30 are adapted for association with retracting devices which tend to normally and individually move the arms toward the periphery of the reel-body.

As shown by Fig. 6, the inner portion of each tubular reel-arm is provided with a bent rod 40, the latter being fixed in any suitable way in the inner portion of the reel-arm and having a member extending at right angles to said reel-arm. The bent rods of the plurality of reel-arms are housed within the space afforded by the reinforcement-rim of the reel-body, and to each bent rod is attached one end portion of a coiled spring 41, the latter being also disposed within the rim of the reel-body and having its outer end portion anchored to a pin or stud 42, which is attached to the reel-body and its flange 14. The springs 41 tend to normally draw the bent rods 40 and the tubular reel-arms toward the periphery of the reel, and these arms are adapted to draw inwardly against the tension of their springs when wire is coiled on the reel, whereby the springs become effective in holding the arms under tension and in preventing the accidental uncoiling of the wire which is wound on said reel-arms.

A reel constructed as above described is very strong, durable, and cheap, and owing to the fact that it is of metal barbed wire can be readily wound thereon or unwound therefrom without any liability of the barbs catching into any of the parts thereof.

In the drawings I have shown the reel mounted on a truck so as to be adjusted to rotate on a vertical, horizontal, or inclined axis; but it may be mounted on any suitable support. As shown, the truck consists of the side members 51, provided near their rear ends with depending posts 52, secured to the axle 49 of the wheels 50, and at their forward ends with legs 53, the members being connected together by the bar 53$^a$ in rear of the legs. A platform 56 is secured upon the side members 51 over the axle 49, and upon the platform the table 23 is mounted to turn. The table is mounted on the bolt 68, and to the under side of the table and to the top of the platform 56 concentric rings 70 and 71 are respectively secured. To the table 23 the upright member 20 is hinged, and said member is held in a vertical position by braces 22, hinged to the table by pins 19 and having their other ends detachably engaging studs or pins 25 on the member 20. The hinged member 20 is provided on its outer end portion with a bearing-block 27$^a$, and in this block and the hinged member 20 the inner ends of the reel-supporting spindle 26 are secured, the spindle being provided with the disk or collar 27 near its inner end.

From the foregoing description, taken in connection with the drawings, it will be understood that the member 20 and the reel may be raised to the vertical position which allows the reel to rotate on a horizontal axis, said foldable member 20 being held in the required position by the braces or props 22. The reel may lie at one side of the truck-frame, as in Fig. 2, or the member 20 may be folded downwardly upon the table and the base, so as to bring the reel to a horizontal position and allow it to rotate on a vertical axis, as in Fig. 1. In either position of the reel it is free to rotate on the spindle 26, and the table 23 may be turned or rotated on the axis afforded by the vertical bolt 68, so as to bring the reel into a required position on the base. When the reel is raised and held by the member 20 to the vertical position, the table 23 may easily be turned on the base to make the reel face in any direction, and it is evident that the table may be turned to bring the reel directly over the base or to a reversed position from that shown in Fig. 2, or the reel and the table may be shifted so that said reel will face toward the front or rear of the truck and lie transversely across the longitudinal axis of said truck.

For the purpose of directing the wire to the arms 30 of the reel I employ a guide 43. (Shown more particularly by Figs. 2, 4, and 5 of the drawings.) This guide 43 is doubled upon itself, as at 44, so as to produce a yoke, and said guide has a stem 43ª, which is fastened to a slotted plate 44ª, the latter being clamped by a bolt 44ᵇ to the foldable member 20 of the reel-supporting frame, thus disposing the wire-guide 43 in a position at one side of the reel and mounting it on the foldable member of the frame, so as to be adjustable with the reel. I also contemplate the employment of a brake-spring 45, which is carried by a part of the wire-guide and is disposed for frictional engagement with the rim of the reel-body, thus preventing the reel from rotating too freely on the spindle 26. In emergencies I may employ a brake-shoe 46, which is carried by an arm 48, that is bolted at 47 to the member 20 of the reel-supporting frame. The brake-shoe 46 when in the position shown in the drawings is held out of contact with the reel; but by loosening the nut of the bolt the shoe may be moved into contact with the rim of the reel-body.

Having thus described my invention, I claim as new and desire to secure by Letters Patent—

1. In a disk-like reel, the combination of a reel-body, a plurality of arms secured to said body and disposed to form a winding-surface, said arms being at right angles to the body and supported to move to and from the axis of the reel-body, and springs secured to said arms and tending to draw them toward the periphery of said body.

2. In a reel, a reel-body composed of a disk having a flanged rim portion which extends at an angle to the plane of said disk, and arms projecting at right angles from the disk, said arms being radially movable and yieldingly mounted.

3. A reel comprising a disk-like body having a plurality of radial slots, a plurality of arms fitted slidably in said slots and projecting at right angles from the body, and springs fastened to the reel-body and connected with said arms to normally impel them toward the periphery of said reel-body.

4. In a reel, a disk-like body provided with radial slots, arms mounted to slide in the said slots and provided with projections on their inner ends, and springs secured to the projections of the arms and to the body.

5. A reel comprising a flanged disk forming a housing, a plurality of arms presenting a winding-surface and connected with said disk for movement radially thereon, and springs housed within said flanged disk and connected to said arms.

6. A reel comprising a disk having radial guideways, a plurality of arms forming a winding-surface and fitted to said radial guideways to move freely therein, bent rods attached to said arms, and springs attached to the disk and to said bent rods.

7. A reel comprising a sheet-metal disk having a doubled rim, and a plurality of reinforcement-webs, radial guideways in said disk, a plurality of arms presenting a winding-surface and fitted to said radial guideways for movement freely therein, and means for normally impelling the arms toward the rim of the disk.

8. The combination of an attaching member, a spindle fixed thereto, a reel having a hub-sleeve mounted loosely on said spindle, a bolt fastened to the reel, a bar connecting said bolt and the outer end of the hub-sleeve, and arms attached to the reel-body and presenting a winding-surface.

9. The combination of an attaching member, a spindle fixed thereto, a reel-body having an attached hub-sleeve and mounted loosely on said spindle, a bolt fastened to the reel-body, a slotted bar clamped adjustably to the bolt and to the hub-sleeve, and a plurality of arms attached to the reel-body and presenting a winding-surface.

10. A reel, comprising a disk-like body, a plurality of arms secured to the body, a hub projecting from the body, a bar secured to the outer end of the hub and provided with a handle at its outer end, and a bolt having one end secured to the body and its other end adjustably secured to the outer end of the bar.

11. A reel comprising a disk-like body having a plurality of radial slots, arms held to slide in the slots of the body, springs secured to the arms and body for drawing them toward the periphery of said body, a hub projecting from the center of the body, a bar adjustably secured to the outer end of the hub and provided with a handle at its outer end, and a bolt connecting the outer end of the bar with the body.

In testimony whereof I have signed my name to this specification in the presence of two subscribing witnesses.

WALTER ELLSWORTH EICHHOFF.

Witnesses:
 M. EASTERDAY,
 S. C. SERBIAN.